(12) United States Patent
Lee et al.

(10) Patent No.: US 11,091,672 B2
(45) Date of Patent: Aug. 17, 2021

(54) METHOD FOR MANUFACTURING PRESSURE-SENSITIVE ADHESIVE FILM

(71) Applicant: LG Chem, Ltd., Seoul (KR)

(72) Inventors: Hui Je Lee, Daejeon (KR); Byung Su Park, Daejeon (KR); Yoon Kyung Kwon, Daejeon (KR)

(73) Assignee: LG Chem, Ltd.

(*) Notice: Subject to any disclaimer, the term of this patent is extended or adjusted under 35 U.S.C. 154(b) by 49 days.

(21) Appl. No.: 16/343,615

(22) PCT Filed: Oct. 31, 2017

(86) PCT No.: PCT/KR2017/012145
§ 371 (c)(1),
(2) Date: Apr. 19, 2019

(87) PCT Pub. No.: WO2018/084527
PCT Pub. Date: May 11, 2018

(65) Prior Publication Data
US 2020/0048505 A1    Feb. 13, 2020

(30) Foreign Application Priority Data

Nov. 4, 2016   (KR) .................. 10-2016-0146413
Oct. 30, 2017  (KR) .................. 10-2017-0142311

(51) Int. Cl.
*C09J 7/38*        (2018.01)
*C09J 7/25*        (2018.01)
(Continued)

(52) U.S. Cl.
CPC .............. *C09J 7/385* (2018.01); *B32B 37/12* (2013.01); *C08F 220/1808* (2020.02);
(Continued)

(58) Field of Classification Search
CPC ....................................................... C09J 7/385
See application file for complete search history.

(56) References Cited

U.S. PATENT DOCUMENTS

2013/0158199 A1   6/2013  Iseki et al.
2015/0024198 A1   1/2015  Yamagata et al.
(Continued)

FOREIGN PATENT DOCUMENTS

CN    103173165 A   6/2013
CN    104231983 A   12/2014
(Continued)

OTHER PUBLICATIONS

International Search Report for Application No. PCT/KR2017/012145 dated Jan. 30, 2018.
(Continued)

*Primary Examiner* — Daniel H Lee
(74) *Attorney, Agent, or Firm* — Lerner, David, Littenberg, Krumholz & Mentlik, LLP

(57) ABSTRACT

The present application relates to a method for manufacturing a pressure-sensitive adhesive film. In an embodiment, a method for manufacturing a pressure-sensitive adhesive film having a pressure-sensitive adhesive layer and a base layer includes applying a pressure-sensitive adhesive composition on at least one side of a base layer, where the pressure-sensitive adhesive composition comprises an isocyanate compound, a metal compound and an acrylic polymer; and drying the pressure-sensitive adhesive composition at a temperature of 100° C. or higher to form a pressure-sensitive adhesive layer on the base layer.

11 Claims, 1 Drawing Sheet

(51) Int. Cl.
    *C09J 11/06*     (2006.01)
    *C09J 133/00*     (2006.01)
    *C08K 5/00*     (2006.01)
    *C08G 18/62*     (2006.01)
    *C09J 133/06*     (2006.01)
    *C09J 175/04*     (2006.01)
    *C09J 175/14*     (2006.01)
    *C08F 220/18*     (2006.01)
    *B32B 37/12*     (2006.01)
    *C08K 5/098*     (2006.01)

(52) U.S. Cl.
CPC ........ *C08G 18/6229* (2013.01); *C08K 5/0091* (2013.01); *C09J 7/255* (2018.01); *C09J 11/06* (2013.01); *C09J 133/00* (2013.01); *C09J 133/066* (2013.01); *C09J 175/04* (2013.01); *C09J 175/14* (2013.01); *B32B 2037/1253* (2013.01); *C08G 2170/40* (2013.01); *C08K 5/098* (2013.01); *C09J 2301/408* (2020.08); *C09J 2433/00* (2013.01); *C09J 2467/006* (2013.01)

(56) References Cited

U.S. PATENT DOCUMENTS

| | | |
|---|---|---|
| 2015/0064460 A1 | 3/2015 | Matsumoto et al. |
| 2015/0203728 A1 | 7/2015 | Burckhardt et al. |
| 2015/0259465 A1 | 9/2015 | Burckhardt et al. |
| 2015/0315346 A1 | 11/2015 | Lee et al. |
| 2017/0322358 A1 | 11/2017 | Ueki et al. |

FOREIGN PATENT DOCUMENTS

| | | |
|---|---|---|
| CN | 104419342 A | 3/2015 |
| CN | 105008482 A | 10/2015 |
| CN | 105086862 A | 11/2015 |
| CN | 105385371 A | 3/2016 |
| JP | 2001081422 A | 3/2001 |
| JP | 2013216769 A | 10/2013 |
| JP | 2015000945 A | 1/2015 |
| JP | 2015048394 A | 3/2015 |
| JP | 2015530440 A | 10/2015 |
| JP | 2015534590 A | 12/2015 |
| JP | 2016505675 A | 2/2016 |
| JP | 2016050254 A | 4/2016 |
| JP | 2016139006 A | 8/2016 |
| JP | 2016145341 A | 8/2016 |
| JP | 2016183350 A | 10/2016 |
| JP | 2016183350 A * | 10/2016 |
| JP | 2016531167 A | 10/2016 |
| TW | 201533199 A | 9/2015 |

OTHER PUBLICATIONS

Chinese Search Report for Application No. 201780066669.2, dated Dec. 2, 2020, pp. 1-4.

* cited by examiner

METHOD FOR MANUFACTURING PRESSURE-SENSITIVE ADHESIVE FILM

CROSS-REFERENCE TO RELATED APPLICATIONS

The present application is a national phase entry under 35 U.S.C. § 371 of International Application No. PCT/KR2017/012145, filed on Oct. 31, 2017, which claims the benefit of priority based onto Korean Patent Application No. 10-2016-0146413, filed on Nov. 4, 2016, and Korean Patent Application No. 10-2017-0142311, filed on Oct. 30, 2017, the disclosures of which are incorporated herein by reference in their entirety.

TECHNICAL FIELD

The present application relates to a method for manufacturing a pressure-sensitive adhesive film.

BACKGROUND ART

A liquid crystal display (LCD) is a device for displaying images using liquid crystals, which has advantages such that it consumes less power and can be made a low power consumption and can be made thinner in a plane, and is a display device spotlighted in various fields.

A polarizing plate, which is an optical member applied to the liquid crystal display device or the like, usually has a structure in which a film such as triacetyl cellulose, an acrylic film, and a cycloolefin film is laminated on one side or both sides of a polarizer, and thus a film for protecting the polarizing plate from external impacts or friction and contamination by sticking on the film is required from a manufacturing process to a process of making an LCD module and thus To the process of making the LCD module.

Since such a film can stick to the polarizing plate during the process to accompany optical inspections in a sticking state, it should have high transparency, and since it is peeled off as an unnecessary material after completing the protection role, it should be removed without leaving defects on the polarizing plate or the like upon removal.

Particularly, when a crater is present on the surface of the pressure-sensitive adhesive layer of the film, there is a risk that the crater of the film attached to the polarizing plate is recognized as a defect of the polarizing plate itself during the process, whereby a situation such as process interruption occurs, and there may be a risk that the crater will leave defects on the polarizing plate upon removal of the film.

DISCLOSURE

Technical Problem

It is one object of the present application to provide a pressure-sensitive adhesive film in which craters that may occur upon producing the pressure-sensitive adhesive film are minimized and an optical characteristic is improved.

The above object of the present application and other objects can be all attained by the present application which is described in detail below.

Technical Solution

In one example related to the present application, the present application relates to a method for manufacturing a pressure-sensitive adhesive film. The method of the present application can produce a pressure-sensitive adhesive film capable of protecting the polarizing plate from external impacts or friction and contamination, from the manufacturing process of the polarizing plate to the process of making the LCD module.

Figure 1:
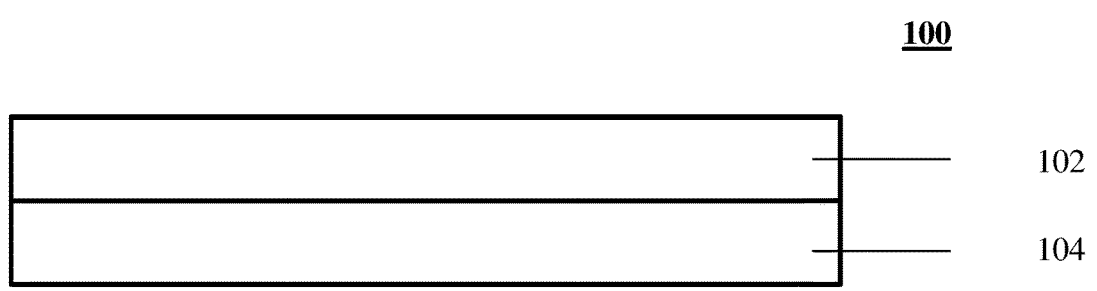
FIG. 1 depicts a pressure-sensitive adhesive film in accordance with an embodiment of the present disclosure.

The method for manufacturing a pressure-sensitive adhesive film, wherein the pressure-sensitive adhesive film 100 includes a pressure-sensitive adhesive layer 102 disposed on a base layer 104 (as depicted in FIG. 1), may comprise a step of applying a pressure-sensitive adhesive composition comprising an isocyanate compound, a metal compound and an acrylic polymer to at least one side of a base layer.

In one example, the isocyanate compound may be a bifunctional or multifunctional compound. The isocyanate compound may react with the cross-linkable functional group of the acrylic polymer to realize a cross-linked structure.

As the isocyanate compound, an isocyanate compound such as tolylene diisocyanate, xylene diisocyanate, diphenylmethane diisocyanate, hexamethylene diisocyanate, isophorone diisocyanate, tetramethylxylene diisocyanate, naphthalene diisocyanate, triphenylmethane triisocyanate or methylene bis(4-phenylmethane) triisocyanate, or a compound that the isocyanate compound is reacted with a polyol can be used, whereas the polyol, for example, trimethylolpropane and the like can be used. In the pressure-sensitive adhesive composition, one or two or more isocyanate compounds of the examples may be used, without being limited thereto.

The isocyanate compound may be contained in an amount of 1 to 20 parts by weight relative to 100 parts by weight of the acrylic polymer. The lower limit of the content of the isocyanate compound may be, for example, 2 parts by weight or more, or 3 parts by weight or more, and the upper limit may be, for example, 15 parts by weight or less, or 10 parts by weight or less. In this range, a cross-linking degree of the pressure-sensitive adhesive composition can be appropriately controlled, whereby all the physical properties of the pressure-sensitive adhesive composition such as cohesive force, pressure-sensitive adhesive force and endurance reliability can be kept excellent.

In one example, the acrylic polymer may comprise a monomer having a cross-linkable functional group as a polymerized unit. In the present application, the inclusion of a monomer as a polymerized unit may mean that the monomer undergoes a polymerization reaction to form a skeleton of the polymer or block, for example, a main chain or a side chain. The cross-linkable functional group is variously known in the manufacturing field of a pressure-sensitive adhesive, which is not particularly limited.

In one example, the monomer having a cross-linkable functional group may be a (meth)acrylate monomer having a hydroxy group, and specifically, hydroxyalkyl (meth)acrylate such as 2-hydroxyethyl (meth)acrylate, 2-hydroxypropyl (meth)acrylate, 4-hydroxybutyl (meth)acrylate, 6-hydroxyhexyl (meth)acrylate or 8-hydroxyoctyl (meth)acrylate, or hydroxyalkylene glycol (meth)acrylate such as 2-hydroxyethylene glycol (meth)acrylate or 2-hydroxypropylene glycol (meth)acrylate, and the like can be used, without being limited thereto. By using the monomer having a cross-linkable functional group, the composition may exhibit an appropriate cohesive force and stress relaxation property to form a pressure-sensitive adhesive having excellent endurance reliability and workability.

Also, the acrylic polymer may further comprise a (meth) acrylic acid ester monomer as a polymerized unit. As the (meth)acrylic acid ester monomer, for example, alkyl (meth) acrylate having an alkyl group with 1 to 20 carbon atoms, 1 to 16 carbon atoms, 1 to 12 carbon atoms, 1 to 8 carbon atoms or 1 to 4 carbon atoms can be used. Here, the alkyl group may be linear, branched or cyclic. An example of such a monomer may be methyl (meth)acrylate, ethyl (meth) acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth) acrylate, 2-ethylbutyl (meth)acrylate, n-octyl (meth)acrylate, isobornyl (meth)acrylate, isooctyl (meth)acrylate, isononyl (meth)acrylate and lauryl (meth)acrylate, and the like.

In one example, a metal compound may be included in the pressure-sensitive adhesive composition. The metal compound can be used as a catalyst for controlling the reaction rate of the pressure-sensitive adhesive composition, and can accelerate the cross-linking reaction to impart an appropriate cohesive force thereto. In particular, it can selectively accelerate a urethane reaction, which is a cross-linking reaction, and inhibit a urea reaction, which is a side reaction.

[Urea reaction]

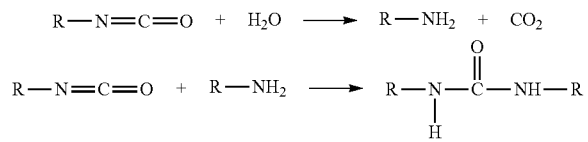

The urea reaction is a reaction which can occur by reacting isocyanate with air or moisture contained in a solvent, where since a crater may occur in the pressure-sensitive adhesive layer due to carbon dioxide ($CO_2$) gas generated in the urea reaction process, the occurrence of craters can be suppressed by suppressing the urea reaction.

The metal compound may comprise at least one metal of iron (Fe), zinc (Zn), zirconium (Zr), tin (Sn) and bismuth (Bi), and preferably, iron (Fe). In the case of aluminum (Al) conventionally used mainly, there is a problem that the hardening promoting effect is small, so that peel force is increased as well as the occurrence of craters cannot be suppressed. On the other hand, by comprising the metal, the urea reaction can be effectively suppressed to inhibit the occurrence of craters, while maintaining proper peel force, and even if craters are formed, only craters having a very small size, for example, a diameter of 500 μm or less can be formed.

In one example, the metal compound may comprise diketonate or carboxylate as a ligand, and preferably may comprise diketonate as a ligand. The metal compound may be present in the form of a complex compound in which the at least one metal and the ligand are linked. By comprising the ligand, the urea reaction can be effectively suppressed to inhibit the occurrence of craters, and even if craters are formed, only craters having a very small size, for example, a diameter of 500 μm or less can be formed.

In one example, the metal compound may be included in an amount of 0.01 to 0.5 parts by weight relative to 100 parts by weight of the acrylic polymer. The lower limit of the content of the metal compound may be, for example, 0.03 parts by weight or more, or 0.05 parts by weight or more, and the upper limit may be, for example, 0.4 parts by weight or less, or 0.3 parts by weight or less. In this range, the reaction rate of the pressure-sensitive adhesive composition can be suitably controlled, and appropriate tackiness and endurance reliability can be imparted.

In the present application, the method of applying the pressure-sensitive adhesive composition on the base layer is not particularly limited, and for example, the composition can be applied to the base layer by a conventional means such as a bar coater.

In addition, the method for manufacturing a pressure-sensitive adhesive film may comprise a step of drying the pressure-sensitive adhesive composition to form a pressure-sensitive adhesive layer after applying the composition. The solvent or moisture contained in the pressure-sensitive adhesive composition may be evaporated through the drying, and the drying temperature is not particularly limited, which may be appropriately adjusted depending on the components and content of the solvent used.

In one example, the drying temperature may be at a temperature of 100° C. or higher, or 110° C. or higher. The upper limit of the temperature is not particularly limited, but may be 150° C. or lower. In the case of drying in the above temperature range, the occurrence of craters can be suppressed by evaporation of moisture or the like, the color index of the pressure-sensitive adhesive film can be lowered, the transparency can be improved by a low color index, and optical characteristics can be improved.

The drying time is not particularly limited, and in one example, it may be in a range of 20 seconds to 120 seconds, 40 seconds to 100 seconds, or 50 seconds to 80 seconds.

The thickness of the formed pressure-sensitive adhesive layer is not particularly limited, and may be, for example, 6 μm to 100 μm, and in another example, it may be 8 μm or more, 10 μm or more, or 15 μm or more, and may be formed in a thickness range of 90 μm or less, 70 μm or less, 60 μm or less, or 50 μm or less. If the thickness of the pressure-sensitive adhesive layer is out of the above-described range, it is difficult to form a uniform pressure-sensitive adhesive layer, which may result in uneven physical properties.

As the base layer, a general transparent film in this field can be used without limitation, which may include, for example, a plastic film, such as a polyester film such as polyethylene terephthalate or polybutylene terephthalate, a polytetrafluoroethylene film, a polyethylene film, a polypropylene film, a polybutene film, a polybutadiene film, a vinyl chloride copolymer film or a polyimide film. Such a base layer may be composed of a single layer of the film, or may also be laminated by two or more layers, and optionally, may also further comprise a functional layer such as an antifouling layer or an antistatic layer. In the present invention, a surface treatment such as a primer treatment may also be performed on one side or both sides of the base layer in terms of improving adhesiveness of the base layer.

The thickness of the base layer is suitably selected depending on applications, which is not particularly limited, and may be, for example, 5 μm to 500 μm, and in another example, it may be 10 μm or more, 20 μm or more, or 30 μm or more, and may be formed in a thickness range of 400 μm or less, 300 μm or less, 200 μm or less, or 100 μm or less.

In one example, the pressure-sensitive adhesive composition may further comprise a curing retardant. The curing retardant may comprise at least one of β-keto ester such as methyl acetoacetate, ethyl acetoacetate, octyl acetoacetate, oleyl acetoacetate, lauryl acetoacetate and stearyl acetoacetate, or β-diketone such as acetylacetone, 2,4-hexanedione and benzoylacetone.

The pressure-sensitive adhesive composition of the present application may also suitably blend known additives such as a silane coupling agent, an antioxidant, a surfactant, a curing accelerator, a plasticizer, a filler, a processing aid and an anti-aging agent as other components. These may be used alone or in combination of two or more.

In one example, the method for manufacturing a pressure-sensitive adhesive film may further comprise a step of laminating a release film after the drying step. The release film may be a film to which a releasing material for preventing fixation of the pressure-sensitive adhesive is applied. The type of the releasing material is not particularly limited, and for example, a silicone release agent, a fluorine coating, a polyethylene coating, or the like can be used.

In one example, the method for manufacturing a pressure-sensitive adhesive film may further comprise a step of curing after lamination of the release film. The method of curing is not particularly limited and may be thermosetting or photo-curing, and in one example, the curing may be performed at a temperature of 30° C. to 60° C. Also, the curing time may be for 24 hours to 72 hours. Outside the curing temperature range, lifting of the laminated release film may occur.

According to another example related to the present application, in a pressure-sensitive adhesive film comprising a base layer and a pressure-sensitive adhesive layer cured by a pressure-sensitive adhesive composition comprising an isocyanate compound, a metal compound and an acrylic polymer, it may be a method for manufacturing a pressure-sensitive adhesive film, wherein the pressure-sensitive adhesive layer is formed so that craters are present at a number of $5/m^2$ or less.

In one example, the crater may have a diameter of 500 μm or less, 400 μm or less, or 300 μm or less. The lower limit of the diameter is not particularly limited and in one example, it may be 10 μm or more. The diameter of the crater may be measured in a two-dimensional shape as viewed from above, and when the two-dimensional shape of the crater is not circular, the diameter may mean a length which is measured the greatest.

In another example, the depth of the crater is measured below the thickness of the pressure-sensitive adhesive layer, which may be 5 μm or less, or 3 μm or less. The lower limit of the depth is not particularly limited and may be 0.1 μm or more in depth. The depth of the crater may mean a length, which is measured the largest, of the depths formed by the craters, and the thicker the thickness of the pressure-sensitive adhesive layer, the deeper the crater may be.

When the craters formed in the pressure-sensitive adhesive layer satisfy the number and size, a pressure-sensitive adhesive film having excellent endurance reliability and workability can be produced.

Figure 2:
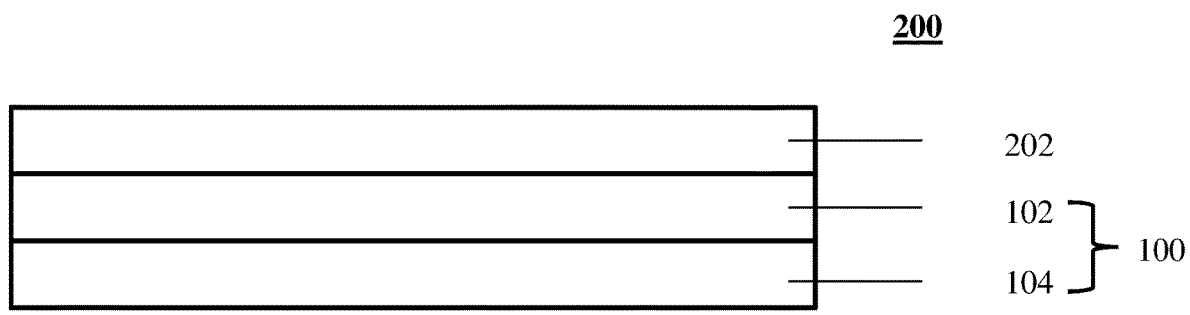
FIG. 2 depicts an optical laminate in accordance with an embodiment of the present disclosure.

According to another example related to the present application, it may be an optical laminate 200 (depicted in FIG. 2) comprising an optical film 202; and a pressure-sensitive adhesive film 100, having the pressure-sensitive adhesive layer 104 disposed on the base layer 102 formed on one side or both sides of the optical film.

Advantageous Effects

According to the method for manufacturing a pressure-sensitive adhesive film of the present application, the pressure-sensitive adhesive film has a low color index to have high transparency and the generation of craters is minimized, whereby a pressure-sensitive adhesive film having excellent endurance reliability and workability can be provided.

BEST MODE

Hereinafter, the present application will be described in detail by way of examples. However, the scope of protection of the present application is not limited by the examples described below.

Method of Measuring Physical Properties

Experimental Example 1: Crater Occurrence Evaluation

For the pressure-sensitive adhesive films prepared in Examples 1 to 6 and Comparative Examples 1 to 4 below, the number of crater occurrences was measured by using a foreign matter tester. As a result of measurements, X represents the case where a crater having a diameter of 500 μm or more and a depth of 7 μm or more was generated, and A represents the case where a crater having a diameter of 500 μm or less and a depth of 7 μm or less was not generated, B represents the case where 1 to 5 craters having a diameter of 500 μm or less and a depth of 7 μm or less are generated, C represents the case where 6 to 10 craters having a diameter of 500 μm or less and a depth of 7 μm or less are generated and D represents the case where over 10 craters having a diameter of 500 μm or less and a depth of 7 μm or less are generated. The results are as shown in Table 2.

Experimental Example 2: Color Index Evaluation

For the pressure-sensitive adhesive films prepared in Examples 1 to 6 and Comparative Examples 1 to 4 below, the color index was measured using a colorimeter (COH-400). The results are as shown in Table 2, where the higher the value, yellowness more increases to exhibit lower transparency.

Example 1

(1) Preparation of Pressure-Sensitive Adhesive Composition 2-ethylhexyl acrylate and 2-hydroxylethyl acrylate were copolymerized in a weight ratio of 95:5 to prepare an acrylic polymer solution having a solid content concentration of about 40%. Ethyl acetate was used as the solvent.

Then, 5 parts by weight of an isocyanate compound (HDI trimer, product name: DR750HD), 7.5 parts by weight of a curing retardant (acetylacetone) and 0.05 part by weight of an iron compound (Fe (III) acetylacetonate) having diketonate as a ligand, relative to 100 parts by weight of the solid content of the acrylic polymer solution, were uniformly blended to prepare a pressure-sensitive adhesive composition.

(2) Manufacture of Pressure-Sensitive Adhesive Film

The pressure-sensitive adhesive composition prepared above is bar-coated on one side of PET (poly(ethylene terephthalate)) and dried at 120° C. for 1 minute. Immediately after drying, a release film was laminated and cured at 40° C. for 48 hours to manufacture a pressure-sensitive adhesive film (1 m×100 m) comprising a pressure-sensitive adhesive layer having a thickness of 15 μm.

Examples 2 to 6 and Comparative Examples 1 to 5

(1) Preparation of Pressure-Sensitive Adhesive Composition

A pressure-sensitive adhesive composition was prepared in the same manner as in Example 1, except that the metal compound was changed as shown in Table 1 below.

(2) Manufacture of Pressure-Sensitive Adhesive Film

A pressure-sensitive adhesive film was prepared in the same manner as in Example 1, except that the drying temperature in the pressure-sensitive adhesive composition prepared above was changed as in Table 1 below.

TABLE 1

|  | Metal compound | | Drying temperature (° C.) |
|---|---|---|---|
|  | Type | Part by weight |  |
| Example 1 | Fe acetylacetonate (Fe, diketonate ligand) | 0.05 | 120 |
| Example 2 | Fe acetylacetonate (Fe, diketonate ligand) | 0.1 | 110 |
| Example 3 | Fe acetylacetonate (Fe, diketonate ligand) | 0.1 | 120 |
| Example 4 | Fe acetylacetonate (Fe, diketonate ligand) | 0.1 | 130 |
| Example 5 | Zn acetylacetonate (Zn, diketonate ligand) | 0.1 | 120 |
| Example 6 | Zr acetylacetonate (Zr, diketonate ligand) | 0.1 | 120 |
| Comparative Example 1 | Dibutyltin dilaurate (Sn, carboxylate ligand) | 0.01 | 90 |
| Comparative Example 2 | Zn ocotate (Zn, carboxylate ligand) | 0.2 | 90 |
| Comparative Example 3 | Zr ocotate (Zr, carboxylate ligand) | 0.2 | 90 |
| Comparative Example 4 | Fe acetylacetonate (Fe, diketonate ligand) | 0.1 | 90 |
| Comparative Example 5 | Al acetylacetonate (Al, diketonate ligand) | 0.1 | 120 |

TABLE 2

|  | Crater occurrence | Color index (b*) |
|---|---|---|
| Example 1 | A | 0.35 |
| Example 2 | A | 0.49 |
| Example 3 | A | 0.41 |
| Example 4 | A | 0.38 |
| Example 5 | B | 0.36 |
| Example 6 | B | 0.37 |
| Comparative Example 1 | D | 0.34 |
| Comparative Example 2 | D | 0.36 |
| Comparative Example 3 | D | 0.36 |
| Comparative Example 4 | A | 1.1 |
| Comparative Example 5 | D | 0.36 |

The invention claimed is:

1. A method for manufacturing a pressure-sensitive adhesive film, the pressure-sensitive adhesive film having a pressure-sensitive adhesive layer and a base layer, the method comprising:
applying a pressure-sensitive adhesive composition to at least one side of a base layer, wherein the pressure-sensitive adhesive composition comprises an isocyanate compound, a metal compound, and an acrylic polymer; and
drying the pressure-sensitive adhesive composition at a temperature of 110° C. to 130° C. to form a pressure-sensitive adhesive layer on the base layer,
wherein the metal compound comprises at least one metal of iron (Fe), zinc (Zn), zirconium (Zr), and a ligand that is diketonate,
wherein craters are present in the pressure-sensitive adhesive layer at a number of 5/m² or less,
wherein the craters have a diameter of 500 μm or less and a depth of 7 μm or less, and
wherein a color index of the pressure-sensitive adhesive layer ranges from 0.35 to 0.49.

2. The method for manufacturing a pressure-sensitive adhesive film according to claim 1, wherein the metal compound comprises an iron (Fe) metal and a diketonate ligand.

3. The method for manufacturing a pressure-sensitive adhesive film according to claim 1, wherein the acrylic polymer comprises a (meth)acrylate monomer having a hydroxy group as a polymerized unit.

4. The method for manufacturing a pressure-sensitive adhesive film according to claim 1, wherein the isocyanate compound is a bifunctional or multifunctional compound.

5. The method for manufacturing a pressure-sensitive adhesive film according to claim 1, wherein the base layer comprises any one of a polyester film, a polytetrafluoroethylene film, a polyethylene film, a polypropylene film, a polybutene film, a polybutadiene film, a vinyl chloride copolymer film, or a polyimide film.

6. The method for manufacturing a pressure-sensitive adhesive film according to claim 1, wherein the pressure-sensitive adhesive composition comprises 0.01 to 0.5 parts by weight of the metal compound and 1 to 20 parts by weight of the isocyanate compound, relative to 100 parts by weight of the acrylic polymer.

7. The method for manufacturing a pressure-sensitive adhesive film according to claim 1, wherein the pressure-sensitive adhesive composition further comprises a curing retardant.

8. The method for manufacturing a pressure-sensitive adhesive film according to claim 7, wherein the curing retardant is one or more of methyl acetoacetate, ethyl acetoacetate, octyl acetoacetate, oleyl acetoacetate, lauryl acetoacetate, stearyl acetoacetate, acetylacetone, 2,4-hexanedione or benzoylacetone.

9. The method for manufacturing a pressure-sensitive adhesive film according to claim 1, further comprising:
laminating a release film on the pressure-sensitive adhesive layer after the drying step.

10. The method for manufacturing a pressure-sensitive adhesive film according to claim 9, further comprising:
curing, after the lamination of the release film, at a temperature range of 30° C. to 60° C.

11. An optical laminate, comprising:
an optical film; and
a pressure-sensitive adhesive film, which is manufactured according to the method of claim 1, formed on one side or both sides of the optical film,
wherein the pressure-sensitive adhesive film comprises a pressure-sensitive adhesive layer and a base layer,
wherein craters are present in the pressure-sensitive adhesive layer at a number of 5/m² or less,
wherein the craters have a diameter of 500 μm or less and a depth of 7μm or less, and wherein a color index of the pressure-sensitive adhesive layer ranges from 0.35 to 0.49, wherein the method comprises:

applying a pressure-sensitive adhesive composition to at least one side of the base layer, wherein the pressure-sensitive adhesive composition comprises an isocyanate compound, a metal compound, and an acrylic polymer; and drying the pressure-sensitive adhesive composition at a temperature of 110° C. to 130° C. to form the pressure-sensitive adhesive layer on the base layer, wherein the metal compound comprises at least one metal of iron (Fe), zinc (Zn), zirconium (Zr), and a ligand that is diketonate.

* * * * *